United States Patent [19]
Ciotola

[11] Patent Number: 5,441,282
[45] Date of Patent: Aug. 15, 1995

[54] MECHANICAL SEAL

[76] Inventor: Alfredo A. Ciotola, 6 Trinity Pl., Warren, N.J. 07059

[21] Appl. No.: 57,332

[22] Filed: May 3, 1993

[51] Int. Cl.⁶ .............................................. F16J 15/34
[52] U.S. Cl. ...................................... 277/85; 277/92; 277/206 R
[58] Field of Search ........................ 277/42, 43, 85, 88, 277/92, 206 R

[56] References Cited

U.S. PATENT DOCUMENTS

| | | | |
|---|---|---|---|
| 1,607,943 | 11/1926 | Carson et al. | 277/206 R |
| 1,947,623 | 2/1934 | Shimer | 277/206 R |
| 1,993,268 | 3/1935 | Ferguson | 277/92 |
| 2,366,161 | 1/1945 | Tweedale | 277/206 R |
| 2,843,404 | 7/1958 | Janetz | 277/85 |
| 2,863,680 | 12/1958 | Taltavall, Jr. | 277/88 |
| 3,457,870 | 7/1969 | Sleeter | 277/88 |
| 3,480,285 | 11/1969 | Anderson | 277/88 |
| 4,266,786 | 5/1981 | Wiese | 277/85 X |
| 4,348,032 | 9/1982 | Hanson et al. | 277/206 R X |
| 4,572,515 | 2/1986 | Grazioli | 277/206 R X |
| 4,639,000 | 1/1987 | Warner | 277/41 |
| 4,832,351 | 5/1989 | Ciotola | 277/81 R |
| 4,989,882 | 2/1991 | Warner et al. | 277/11 |
| 4,993,720 | 2/1991 | Ciotola | 277/27 |

FOREIGN PATENT DOCUMENTS

| | | | |
|---|---|---|---|
| 0449004 | 6/1948 | Canada | 277/85 |
| 0618100 | 4/1961 | Canada | 277/88 |
| 0027900 | 4/1964 | Germany | 277/88 |
| 1425364 | 2/1976 | United Kingdom | 277/206 R |

Primary Examiner—William A. Cuchlinski, Jr.
Assistant Examiner—John L. Beres

[57] ABSTRACT

An improved mechanical seal of the type useful to form a seal between a stationary housing and a rotatable shaft. The seal comprises a rotatable seal element and a stationary seal element. There is an elastic element which forces the rotatable and stationary seal elements to sealingly engage. The mechanical seal can comprise removable clips to connect the seal to the housing.

18 Claims, 2 Drawing Sheets

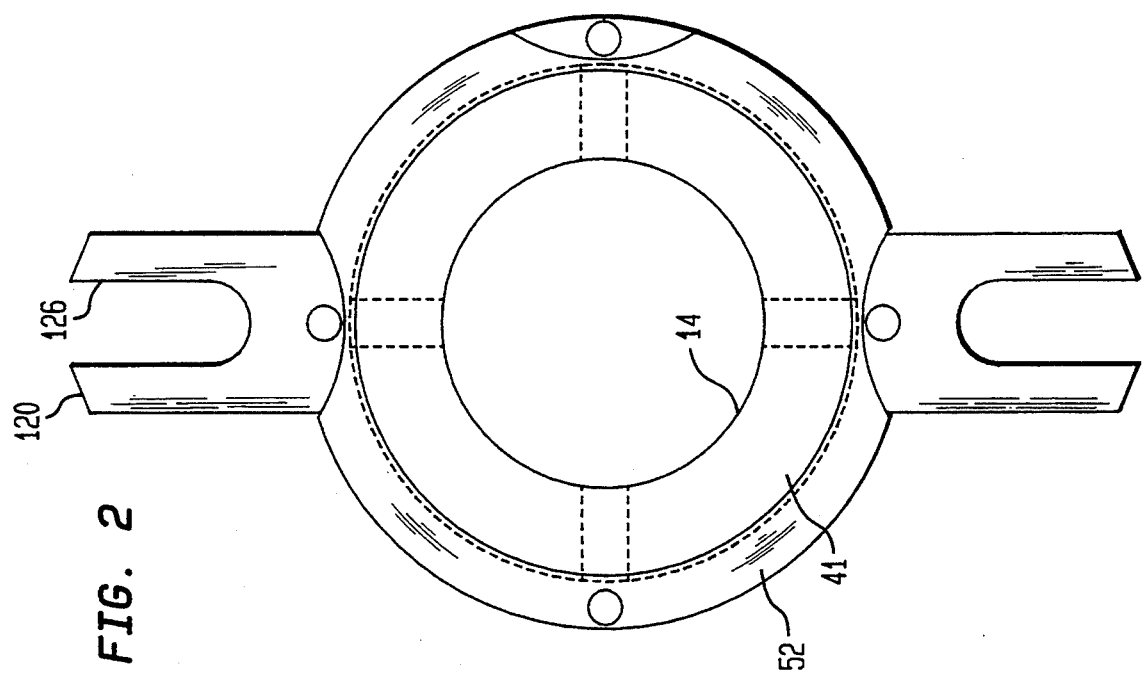
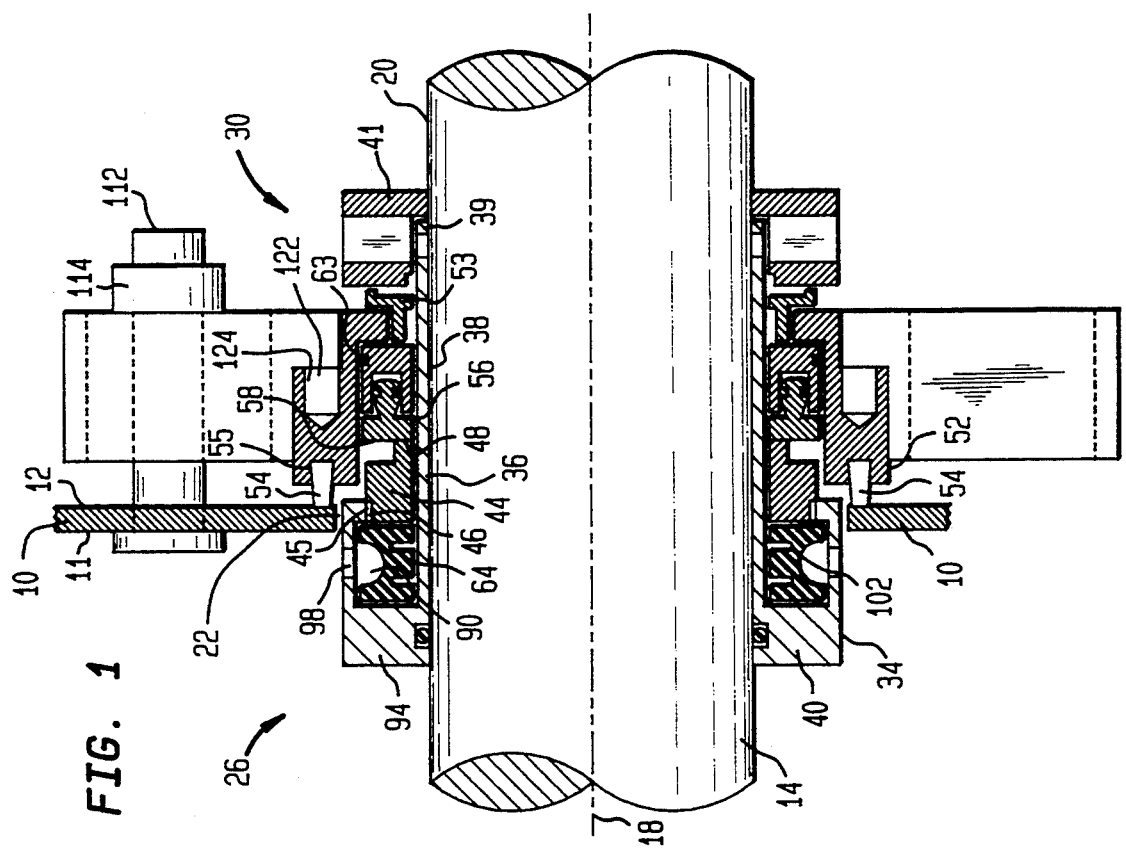

MECHANICAL SEAL

BACKGROUND OF THE INVENTION

1. Field of the Invention

The present invention relates to mechanical seals, and more particularly having an improved mechanical seal having an elastic element and a mechanical seal having an improved means to secure the seal to a machine stationary housing.

2. Description of the Related Art

A mechanical seal provides a seal between a rotatable element, typically a shaft, and a stationary housing of an apparatus, typically containing fluid. Such seals are often associated with a fluid pump having a shaft extending through a pump housing wall. The pump shaft can be coupled to a motor through a motor shaft. The mechanical seal forms a seal between the pump shaft and the outer surface of the pump housing. Mechanical seals for such applications are commercially available and are described in U.S. Pat. Nos. 4,639,000; 4,832,351; 4,989,882; and 4,993,720. Such seals endure rigorous environments and last for extended time periods.

Seals which are known in the art comprise rotatable components and stationary components which contact to form a seal at opposing sealing surfaces. The rotatable components include a shaft attachment means. Such a means is typically a sleeve having an inner perimeter surface which sealingly fits over the outer perimeter surface of the shaft and is connected to the shaft by connecting means such as set screws. An "O" ring typically provides a seal between the shaft and the sleeve. There is a rotatable circumferential seal element interconnected to the sleeve so as to rotate when the shaft and sleeve rotate. The sleeve extends axially along the shaft.

The stationary components comprise a gland which extends circumferentially around the shaft. The gland abuts against the outer housing surface around the shaft. There is typically a sealing gasket interconnected to the gland and located between the gland and the housing. The gland functions as a base by which the seal is attached to the housing. The connection is typically accomplished by bolts extending from the outer housing wall. The bolts pass through slots or connecting extensions extending radially from the gland through the connecting slots or connecting extensions and secured with nuts. A stationary seal element is located between the inner circumferential surface of the gland facing the shaft (i.e. the gland inner surface) and the shaft. The stationary seal is directly or indirectly connected to the stationary gland. There are suitable means such as described in U.S. Pat. Nos. 4,832,351 and 4,989,882 to axially center the various stationary elements on the shaft. A circumferential spacing is maintained between the stationary elements, and the shaft and various of the rotating elements.

The stationary and rotatable components meet at opposing sealing surfaces of the rotatable and stationary seal elements. There is typically a metal spring which forces either one of the seal elements toward the opposing seal element to cause the opposing surfaces to be pressed together. The opposing seal element has restricted axial movement and the surface of one seal element is forced by the spring against the surface of the opposing seal element. Thereby, a seal is formed between the opposing sealing surfaces, i.e., the rotatable and stationary sealing elements.

Mechanical seals known in the art have at least one "O" ring associated with the sealing element being acted on, by the spring. The spring forces this element toward the opposing element to form a seal. The "O" ring must form a seal not withstanding the axial movement and is known as a "dynamic" "O" ring. Additionally, the dynamic "O" ring is located in an "O" ring slot which can clog. The spring must therefore provide force to cause the sealing elements to come together under sufficient pressure to form a seal while overcoming the resistance of the dynamic "O" ring and clogging in the area of the dynamic "O" ring. It would be desirable to eliminate the dynamic "O" ring as well as the metal spring.

Additionally, the means to connect the mechanical seal to the housing is integrated into the structure of the stationary components. The mechanical seal is often set in place and removed in the small space between the pump and motor. The means to attach the seal take up space and make access to the mechanical seal difficult for both installation and removal. A design with easier access to the seal elements at the location where the shaft extends from the housing is desireable.

SUMMARY OF THE INVENTION

The improved mechanical seal of the present invention includes an elastic spring element of the type useful to force a rotatable seal surface into sealing contact with a stationary seal surface. Additionally, the mechanical seal can be connected to a machine housing using removable clips to enable easier access for installation, maintenance and repairs to the mechanical seal and machinery to which it is attached, particularly in restricted spaces.

The mechanical seal of the present invention is useful to form a seal between a stationary housing and a rotatable shaft having a shaft axis. The shaft has a shaft surface having a shaft perimeter and extends through an opening in the housing. The housing has an inner surface and an outer surface.

The mechanical seal comprises rotatable components and stationary components. The rotatable components are interconnected to the shaft and rotate with the shaft. The stationary components are interconnected to the housing and do not rotate. The rotatable components and stationary components are positioned relative to each other so that a rotatable seal surface sealingly engages a stationary seal surface. Such a mechanical seal is particularly useful to form seals on machines which have rotatable shafts extending therefrom and fluid inside such as fluid pumps, i.e., water pumps.

In a preferred embodiment the rotatable components comprises a sleeve having a shaft side inner wall. The inner wall has inner perimeter which fits over the outer perimeter of the shaft. A radial wall extends from the inner wall of the sleeve. A rotatable circumferential seal element is interconnected to the sleeve. The rotatable seal element has a rotatable seal surface.

In a preferred embodiment the rotatable component further comprises a rotatable chamber defined by the shaft side inner wall, the radial wall and a circumferential outer wall. The outer wall extends from the radial wall over at least part of the shaft side inner wall and has openings. The rotatable circumferential seal element is located in the rotatable chamber with the rotatable seal surface facing the stationary seal surface.

Where the chamber is in communication with the fluid in the housing, the fluid communicates into the rotatable chamber through the openings.

A circumferential elastic element of the present invention is located around the sleeve between the radial sleeve wall and the rotatable seal element. The elastic element is an elastic, preferably elastomeric, sealing spring having an inner side adjacent to the sleeve inner wall, a radial wall side adjacent to the sleeve radial wall, a seal side adjacent to the rotatable seal element and disposed to engage and force the rotatable seal element axially away from the radial wall and toward the stationary seal element, and an outer side opposite the inner side. The outer side has an outer seal side surface extending for at least part of the circumference of the elastic element. The outer seal side surface extends angularly for at least part of the axial distance from the outer side surface at the seal side toward the inner side.

Preferably, the outer side of the elastic element has an outer radial side surface extending for at least part of the circumferential element and extending angularly from the outer side at the radial side toward the inner side. Preferably, the elastic element outer seal side surface and outer radial side surface form a circumferential groove in the outer side. More preferably, the outer side grooves have cross-sectional shapes selected frown the group consisting of "U" and "V".

It is preferred that the forces exerted by the elastic spring element at the radial wall side and at the seal side be relatively uniform across the respective surfaces. In order to compensate for the groove in the outer side surface there can be at least one and preferably two circumferential inner side grooves in the inner side of the elastic element. Preferably, the outer side groove and the inner side groove have a combined radial dimension at least equal to the radial length of the elastic element (distance from inner side to outer side). This enables the hydraulic forces to act in a balanced manner along the whole radial length of the elastic element.

In certain embodiments addition elastic force can be provided by a spring means to force the outer seal surface toward the rotatable seal. The spring means can also force the outer radial surface toward the radial wall. The preferred springs are circumferential washer rings having a major plane at a greater angle to the radial plane of the elastic than the seal side surface and radial side surface. The washer is able to force the seal side of the elastic element toward the adjacent seal element.

The stationary components comprise a gland extending around the perimeter of the shaft. The gland has a gland component which can sealingly abut against the housing around the shaft. A stationary circumferential seal element is interconnected to the gland. The stationary seal element has a stationary seal surface. The gland is located on the shaft at a position whereby the stationary seal surface opposes the rotatable seal surface.

The present invention also includes an improved mechanical seal comprising connector clips having interconnect means to be removably connected to the stationary components of the seal and means to interconnect to the housing. Preferred interconnecting means to removeably connect the stationary components to the connector clips are opposing pins and slots to receive the pins in respective stationary component and clips. The means to interconnect to the housing are slots to receive bolts connected to and extending from the housing.

The present invention also includes an elastic sealing spring having an inner side, a first radial side, a second radial side and an outer side. The outer side has a circumferential groove having a first surface extending angularly from the outer side toward the inner side and a second surface extending from the outer side angularly toward the inner side. As indicated above, there can be a spring element adjacent to at least one of the first surface and second surface of the outer side to force at least one of said first outer side toward the first radial side and said second outer surface toward the second radial side. It is recognized that this elastic spring can be used to force the stationary seal element toward the rotable seal element or the rotatable seal element toward the stationary element. The latter is preferred since the elastic element can eliminate an "O" ring on the rotational seal element.

BRIEF DESCRIPTION OF THE DRAWINGS

FIG. 1 is a partial section view of a preferred embodiment of the mechanical seal of the present invention on a shaft connected to a housing.

FIG. 2 is an end view of the embodiment shown in FIG. 1.

DESCRIPTION OF THE PREFERRED EMBODIMENTS

Figure 3:
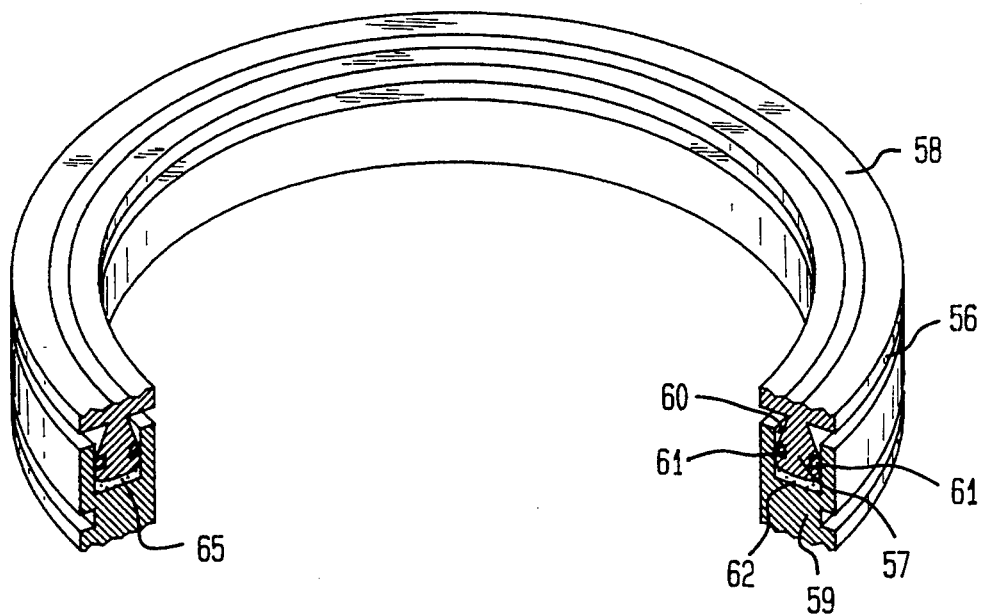
FIG. 3 illustrates a preferred stationary seal subassembly.

The present invention will be understood by those skilled in the art by reference to the accompanying FIGS. 1-5 which illustrate preferred embodiments.

The preferred mechanical seal is shown forming a seal on an apparatus, such as a pump, between a stationary housing 10 and a rotatable shaft 14 having a shaft axis 18. Housing 10 has inner surface 11 and outer surface 12. The shaft 14 has a shaft perimeter 20 and extends through an opening 22 in the housing 10.

The mechanical seal comprises rotatable components 26 in a rotatable assembly and stationary components 30 in a stationary assembly. The rotatable components 26 are interconnected to shaft 14 by suitable means and rotate with the shaft 14. The stationary components 30 are interconnected to the housing 10 and do not rotate. The stationary assembly of components arid rotatable assembly of components are positioned relative to one another to meet at respective seal surfaces, i.e. a rotatable seat surface and a stationary seal surface to form a mechanical seal.

The rotatable components 26 include a sleeve 34. The sleeve 34 has a shaft side inner wall 36 which has an inner surface having an inner perimeter 38 which fits over the outer perimeter 20 of the shaft 14. The sleeve 34 preferably has a radial wall 40 which extends from the inner wall 36. A rotatable circumferential seal element 44 is interconnected to the sleeve 34 in order to rotate. Element 44 can be connected to sleeve 34 by any suitable means such as a pin or opposing slots and extensions in the sleeve and element 44. Preferably, sleeve 34 has extensions 45 which mate with opposing grooves 46 in element 44. The rotatable seal element 44 has a rotatable seal surface 48. The sleeve 34 can have suitable means by which it can be secured to the shaft 14. Such means include set screws (not shown) which can pass through threaded set screw holes. Additionally, there can be a collar 41 having holes through which the set screws pass and which can also be secured in place by the set screws. The various elements of the rotatable and stationary components can be maintained in place between stationary collar 41 and radial wall 40.

The stationary assembly components 30 include a gland 52 which extends around the perimeter 20 of the shaft 14. The gland 52 has a gland component, such as gland gasket 54 located in circumferential gland gasket slot 55. The gland gasket can sealingly abut against the housing 10 around the shaft 14. A stationary circumferential seal element 56 is directly or indirectly interconnected to the gland 52 by suitable means such as at least one pin or opposing slots and extensions in the gland 52. The stationary seal element 56 has a stationary seal surface 58. The gland 52 is located on the shaft 14 at a position whereby the stationary seal surface 58 opposes the rotatable seal surface 48. The gland 52 can be axially centered around shaft 14 using spacer means 53. The spacer means 53 cam be made of a suitable material such as carbon filled polytetrafluoroethylene or carbon filled phenolic resin.

A preferred stationary seal element 56 assembly is shown in FIG. 3 and described in U.S. Pat. No. 4,832,351, hereby incorporated by reference. Briefly, the stationary seal element 56 has a stationary seal extension 57 opposite the stationary seal surface 58. The extension slideably fits into stationary support ring 59 slot 60. There are floating "O" rings 61 between the extension 57 and the inner walls of the slot 60. A hydraulic medium such as silicon gel is located in the slot cavity 62 between the end of the extension and the bottom of the slot 60. A stationary seal such as "O" ring 63 is located between the support ring 59 and gland 52. Thereby, the stationary seal element 56 is self-aligning arid is axially stable. The seal element 56 can be attached to support ring 59 by suitable means such as pin 65. The support ring 59 remains stationary by suitable means to be attached to gland 52, but is preferably maintained stationary by the friction between "O" ring 63 and gland 52.

A circumferential elastic element 64 is located around the sleeve 34 between the radial sleeve wall 40 and the rotatable seal element 44. The elastic element 64 has an inner side 66 adjacent to the sleeve inner wall 36, a radial wall side 70 adjacent to the sleeve radial wall 40, and a seal side 74 adjacent to the rotatable seal element 44. The elastic element 64 is positioned to sealingly engage and force the rotatable seal element 44 axially away from the radial wall 40 and toward the stationary seal element 56. There is an outer side 78 opposite the inner side 66. The outer side 78 has an outer seal side surface 82 extending for at least part of the circumference of the elastic element 64. The outer seal side surface 82 extends angularly for at least part of the axial distance from the outer side 74 at the seal side toward the inner side 66. Preferably, the elastic element 64 has an outer radial side surface 88 extending for at least part of the circumference of the elastic element 64. The outer radial side surface 88 extends angularly from the outer side 78 at the radial side 70 toward the inner side 66.

In the particularly preferred embodiment illustrated in FIG. 1, the rotatable component assembly further comprises a rotatable chamber 90 defined by the shaft side inner wall 36 of sleeve 34, the radial wall 40 and a circumferential outer wall 94. The outer wall 94 extends from the radial wall 40 over at least part of the shaft side inner wall 36. There are openings 98, preferably in the outer wall 94 to permit fluid from inside the apparatus housing to communicate with the outer side 78 of the elastic element 64. The elastic element 64 is tightly squeezed between radial wall 40 and the rotatable seal element 44. The pressure of the fluid acting on outer seal surface 82 and preferably also outer radial side surface 88 also forces the axial floating rotatable seal element 44 into a sealing contact with the stationary seal element 56 at their respective seal surfaces 48 and 58.

Figure 4:
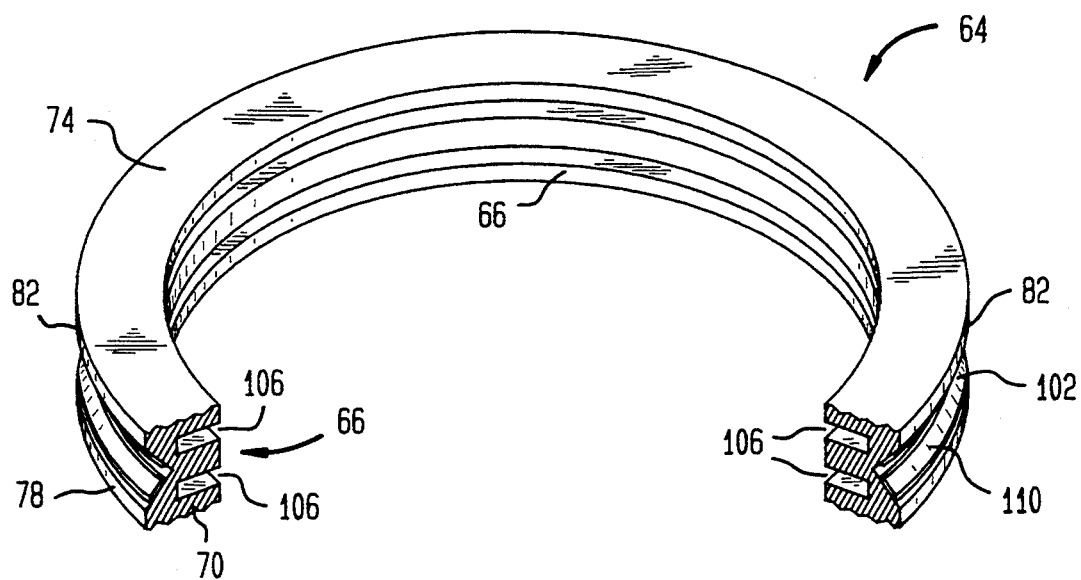
FIG. 4 is an alternate embodiment used to illustrate the elastic element of the present invention.
Figure 5:
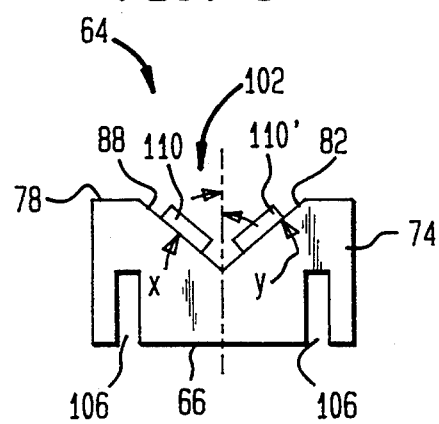
FIG. 5 is a sectional view of the elastic element of FIG. 4.

The outer seal side surface 82 and outer radial side surface 88 in the outer side 78 of the elastic element 64 preferably define a circumferential groove 102 in the outer side 78. The groove preferably has cross-sectional shapes selected from the group consisting of "U" and "V" as shown in FIGS. 1, 4 and 5.

It is desirable to have uniform pressure on radial wall side 70 and seal side wall 74. In order to accomplish this, particularly, where there is a groove 102 in the outer side 78 of the elastic element 64, there is at least one circumferential inner side groove 106 in the inner side 66. More preferably, there are two circumferential grooves 106 extending radially into the inner side 66.

The elastic element 64 can further comprise a spring means to force the outer seal surface 82 toward the rotatable seal 44. The spring means can also force the outer radial surface 88 toward the radial wall 40. Useful and preferred spring means can include angular washers 110 and 110' to force onto outer seal surface 82 and optionally outer radial side surface 88 as shown in FIG. 4. Alternatively, a circumferential spring element having a similar shape to groove 102 and angled toward walls 70 and 74 to force surfaces 88 and 82 toward those walls can be used. By angled it is meant that angle "x" and "y" of surfaces 82 and 88 are less that corresponding angle "x" and "y" of the adjacent spring surfaces before the springs 110 are forced into the groove 102.

The mechanical seal of the present invention can be connected to form a seal between a stationary housing 10 and a rotatable shaft 14 having a shaft axis 18 where the shaft 14 extends through an opening 22 in the housing 10. Typically, there are studs or bolts 112 extending from and interconnected to the housing wall. The extending ends can be threaded to received a nut 114. Typically, there are from two to eight and more typically two to six bolts extending. The gland 52 can have slots or holes to receive the bolts 112. The bolts pass through the gland 52. The gland 52 along with the mechanical seal are secured sealingly in place between the housing 10 and the nuts 114.

In a specific and preferred embodiment of the present invention the mechanical seal further comprises a plurality of connector clips 120 removably interconnected to a stationary component, preferably gland 22. The connection can be a tongue and groove or pin in a hole or slot connection. Preferably each clip 120 has a pin 122 which fits into a corresponding hole or slot 124 in the gland 22. Alternatively, the pin can extend from the gland 22 and the slot can be in the clip 120. The clip 120 can then be put in place after the seal is installed and removed prior to conducting maintenance or removal of the seal. The clip 120 can have means to attach to the housing such as slots 126 through which bolts 112 can pass and be secured by nuts 114. and means to interconnect to the housing.

The various elements of the seal of the present invention can be made of suitable materials to withstand the environments and conditions which must be encountered. Typically, commercially available elastomeric "O" rings can be used. The sleeve 14, gland 22, support ring 59, collar 41 and other related parts can be made of metal, preferably steel and most preferably stainless steel. One of opposing seal elements, either rotatable seal 44 or stationary seal 56 is a hard surface made of a material such as silicon carbide while the other is a soft surface such as carbon. Preferably, the rotatable seal 44 is made of carbon and the stationary seal 56 is made of silicon carbide. The elastic element 64 can be made of a suitable elastomeric material or composite. The base elastomer can be made of chloroprene, nitrile rubber, EPDM or the like.

The mechanical seal of the present invention can be adapted to virtually any size shaft but can typically be used and sized for shafts having diameters ranging from 0.5 to 12 and more typically 1 to 6 inches.

Although the invention is described by reference to a particular illustrative embodiment, changes and modifications may be apparent to those skilled in the art without departing from the spirit and scope of the invention. Therefore, all such changes and modifications are reasonably included within the following claims.

What is claimed is:

1. An improved mechanical seal of the type useful to form a seal between a stationary housing and a rotatable shaft having a shaft axis, the shaft having a shaft perimeter and extending through an opening in the housing, the mechanical seal having rotatable components and stationary components, the rotatable components having a sleeve, the sleeve having a shaft side inner wall having an inner perimeter which fits over the outer perimeter of the shaft and a radial wall extending from the inner wall, and a rotatable circumferential seal element interconnected to the sleeve, the rotatable seal element having a rotatable seal surface, the stationary components having a gland extending around the perimeter of the shaft, the gland having a gland component which can sealingly abut against the housing around the shaft, a stationary circumferential seal element interconnected to the gland, the stationary seal element having a stationary seal surface, the gland located on the shaft at a position whereby the stationary seal surface faces the rotatable seal surface, wherein the improvement comprises:

a circumferential elastic element located around the sleeve between the radial sleeve wall and the rotatable seal element, having an inner side adjacent to the sleeve inner wall, a radial wall side adjacent to the sleeve radial wall, a seal side adjacent to the rotatable seal element and disposed to sealingly engage and force the rotatable seal element axially away from the radial wall, and an outer side opposite the inner side, the outer side having an outer seal side surface extending for at least part of the circumference of the elastic element, the outer side having a single circumferential groove and the inner side having at least one circumferential groove; and the rotatable component further comprising a rotatable chamber defined by the shaft side inner wall, the radial wall and a circumferential outer wall, the outer wall extending from the radial wall over at least part of the shaft side inner wall and having openings.

2. The improved seal as recited in claim 1 wherein the improvement further comprises the outer seal side of the elastic element having an outer radial side surface extending for at least part of the circumferential element and extending angularly from the outer side at the radial side toward the inner side.

3. The improved seal as recited in claim 1 wherein the circumferential groove in the outer side has cross-sectional shapes selected from the group consisting of "U" and "V".

4. The improved seal as recited in claim 1 wherein there are two circumferential grooves extending radially in to the inner side.

5. The improved seal as recited in claim 1 further comprising spring means to force the outer seal surface toward the rotatable seal.

6. The improved seal as recited in claim 5 wherein the spring means force the outer radial surface toward the radial wall.

7. The improved seal as recited in claim 1 with the circumferential elastic element of the outer side circumferential groove having a first surface extending angularly from the outer side toward the inner side and a second surface extending form the outer side angularly toward the inner side.

8. The improved seal as recited in claim 7 further comprising a spring element adjacent to at least one of the first surface of the outer side and second surface of the outer side to force at least one of said first surface toward the first radial side and said second surface toward the second radial side.

9. A mechanical seal useful to form a seal between a stationary housing and a rotatable shaft having a shaft axis, the shaft having a shaft perimeter and extending through an opening in the housing, the mechanical seal comprising rotatable components and stationary components, the rotatable components comprising: a sleeve, the sleeve having a shaft side inner wall having an inner perimeter which fits over the outer perimeter of the shaft and a radial wall extending from the inner wall; a rotatable circumferential seal element interconnected to the sleeve, the rotatable seal element having a rotatable seal surface; and a circumferential elastic element located around the sleeve between the radial sleeve wall and the rotatable seal element, having an inner side adjacent to the sleeve inner wall, a radial wall side adjacent to the sleeve radial wall, a seal side adjacent to the rotatable seal element and disposed to sealingly engage and force the rotatable seal element axially away from the radial wall, and an outer side opposite the inner side, the outer side having an outer seal side surface extending for at least part of the circumference of the elastic element, the outer side having a single circumferential groove and the inner side having at least one circumferential groove; and the stationary components comprising: a gland extending around the perimeter of the shaft, the gland having a gland component which can sealingly abut against the housing around the shaft; and a stationary circumferential seal element interconnected to the gland, the stationary seal element having a stationary seal surface, the gland being located on the shaft at a position whereby the stationary seal surface opposes the rotatable seal surface.

10. The seal as recited in claim 9 wherein the outer seal side of the elastic element has an outer radial side surface extending for at least part of the circumferential element and extending angularly from the outer side at the radial side toward the inner side.

11. The seal as recited in claim 9 wherein the rotatable component further comprises a rotatable chamber defined by the shaft side inner wall the radial wall and a circumferential outer wall, the outer wall extending from the radial wall over at least part of the shaft side inner wall and having openings.

12. The seal as recited in claim 11 wherein there is a circumferential groove in the outer side.

13. The seal as recited in claim 12 wherein the elastic element grooves in the outer side have the cross-sectional shapes selected from the group consisting of "U" and "V".

14. The seal as recited in claim 9 wherein there are two circumferential grooves extending radially into the inner side.

15. The seal as recited in claim 11 further comprising spring means to force the outer seal surface toward the rotatable seal element.

16. The seal as recited in claim 15 wherein the spring means force the outer radial surface toward the radial wall.

17. The seal as recited in claim 9 with the circumferential elastic element of the outer side circumferential groove having a first surface extending angularly from the outer side toward the inner side and a second surface extending form the outer side angularly toward the inner side.

18. The seal as recited in claim 17 further comprising a spring element adjacent to at least one of the first surface of the outer side and second surface of the outer side to force at least one of said first surface toward the first radial side and said second surface toward the second radial side.

* * * * *